United States Patent [19]
Yoneoka et al.

[11] Patent Number: 5,802,342
[45] Date of Patent: Sep. 1, 1998

[54] IMAGE CREATING DEVICE LOADABLE WITH EXTERNAL MEMORY MEDIUM CAPABLE OF STORING AN IMAGE CREATING PROGRAM AND CREATED IMAGE DATA

[75] Inventors: Masaki Yoneoka; Toshitaka Izumida; Norio Kawamoto; Takuji Kaneko; Takako Ohmichi; Hiromichi Okazaki, all of Kobe, Japan

[73] Assignee: Konami Co., Ltd., Hyogo-ken, Japan

[21] Appl. No.: 453,311

[22] Filed: May 30, 1995

Related U.S. Application Data

[63] Continuation of Ser. No. 131,804, Oct. 5, 1993, abandoned.

[30] Foreign Application Priority Data

Oct. 13, 1992 [JP] Japan .................... 4-274407
Sep. 6, 1993 [JP] Japan .................... 5-221336

[51] Int. Cl.⁶ ............................................ G06F 12/14
[52] U.S. Cl. ................................. 395/442; 380/23
[58] Field of Search ............................ 395/442; 380/23

[56] References Cited

U.S. PATENT DOCUMENTS

| | | | |
|---|---|---|---|
| 4,462,076 | 7/1984 | Smith, III ........................ | 380/4 |
| 4,525,599 | 6/1985 | Curran et al. .................... | 380/4 |
| 4,634,807 | 1/1987 | Chorley et al. .................. | 380/4 |
| 4,718,038 | 1/1988 | Yoshida ........................... | 395/491 |
| 4,799,635 | 1/1989 | Nakagawa ........................ | 395/442 |
| 4,924,426 | 5/1990 | Kameda et al. .................. | 395/427 |
| 5,070,479 | 12/1991 | Nakagawa ....................... | 395/182.09 |
| 5,134,391 | 7/1992 | Okada ............................. | 345/116 |
| 5,155,768 | 10/1992 | Matsuhara ...................... | 380/23 |
| 5,321,750 | 6/1994 | Nadan ............................. | 380/20 |
| 5,426,762 | 6/1995 | Nakagawa ....................... | 395/442 |

FOREIGN PATENT DOCUMENTS 17849 1/1989 Japan .
3170997 7/1991 Japan .

*Primary Examiner*—Parshotam S. Lall
*Assistant Examiner*—Kenneth R. Coulter
*Attorney, Agent, or Firm*—Jordan and Hamburg

[57] ABSTRACT

An external memory controller for an image creating device comprises an image creation control section 105 for creating an image data in accordance with an image creation program on the basis of signals supplied from a tablet 101 and a switch 102. The created image data is displayed on the monitor 109. An internal memory section 106 stores the created image data together with its attribute information. An external memory medium 107, storing its own image creation program 701 together with its attribute information 702, is detachably connected to the main body 100 of the apparatus. A memory control unit 104 stores an image data together with the attribute information 702, when created in accordance with the program 701 applied from the external memory medium 107, into the internal memory section 106. The data transfer section 110 controls transmission of image data 703 and its attribute information 704 between the external memory medium 107 and the internal memory section 106. This transmission of image data 703 is prohibited unless the currently running program has the same attribute information as the attribute information of the image data stored in the external memory medium 107 or in the internal memory section 106.

5 Claims, 17 Drawing Sheets

IMAGE CREATING DEVICE LOADABLE WITH EXTERNAL MEMORY MEDIUM CAPABLE OF STORING AN IMAGE CREATING PROGRAM AND CREATED IMAGE DATA

This application is a continuation, of application Ser. No. 08/131,804 filed Oct. 5, 1993, now abandoned.

BACKGROUND OF THE INVENTION

The present invention relates generally to an image creating device plotting a graphic image on a monitor on the basis of coordinate signals inputted from a tablet, and more particularly to an image creating device which is operatively associated with an external memory medium storing application programs.

An image creating device has conventionally been a specialized apparatus dedicated, for example, to the creation of computer graphics for business use or to the creation of graphics for computer software and computer games. In other words, handling of this image creating device for home use is too complicated or difficult to children or the people who are not knowledgeable.

To resolve such an inconvenience, a recently proposed and developed apparatus is an image creating device including simple functions only. (Refer to Unexamined Japanese Patent Publication No. 64-7849/1989 or Unexamined Japanese Patent Publication No. 3-170997/1991).

Such a simplified image creating device is, however, not satisfactory for some people who intend to use it more flexibly because it could afford nothing other than some simple plotting functions.

Providing an external memory medium storing various application programs and cooperatively associating this external memory medium with the image creating device will be one prospective method of resolving the above problem. In this case, however, the amount of image data or other various data created will expand with increasing number of the application software or programs.

A conventional method of storing these data into the same external memory medium is dividing these data into some data files and assigning file names to individual data files. An ordinary personal computer or the like usually comprises a file administration system, in which file names are generally determined or constructed by the use of combination of figure and alphabet. It will be easily guessed that requiring a complicated procedure using such file names in each data retrieval or other operation is not recommendable or not suitable for children use or those who are not familiar with the computer.

If numerous image data are stored in the same memory medium, there is a possibility that a certain software or program is allowed to read out an image data which has been created in accordance with other application software or program. However, even if the stored image data is freely available irrespective of a difference of type of application software or program, it will not be possible to revise or modify this image data into a desirable form since the revision or modification procedure is generally differentiated in accordance with the application software or program.

Furthermore, the issue to be seriously considered in letting anyone freely use the image data stored in the same memory medium will be a problem of unfair use or copy. In view of unfair use or copy, various methods have been already proposed. (Refer to Japanese Patent No. 53-17849/ 1978, Japanese Patent No. 59-18074/1984, and Unexamined Japanese Patent Publication No. 2-210562/1990.) These already proposed methods are, however, not directly applicable to the memory medium comprising numerous image data respectively created by different application software or programs.

SUMMARY OF THE INVENTION

Accordingly, in view of above-described problems, the present invention has a purpose to provide an external memory controller for an image creation device which is extremely easily handled even by children for home use and further enables us to protect the stored image data against unfair use.

In order to accomplish the above purpose, a first aspect of the present invention provides an external memory controller for an image creating device comprising:

image creation control means, provided in a main body of the apparatus, for creating an image data in accordance with an image creation program on the basis of operation signals supplied from a tablet and a switch;

internal memory means, provided in the main body, for storing the image data created by the image creation control means;

monitor means for displaying a visual image transformed from the image data;

external memory medium storing its own image creation program together with its attribute information, and associated with the image creation control means so as to supply its own image creation program to the image creation control means for creation of an image data;

memory control means for causing the internal memory means to store the attribute information of the image creation program supplied from the external memory medium in addition to the image data created by this image creation program;

data transfer means for controlling transmission of image data and attribute information between the external memory medium and the internal memory means;

input means for inputting attribute information of individual image data from the external memory medium to the main body;

judging means for making a judgment as to whether or not an image creation program currently running in the main body has the same attribute information as the attribute information of the image data stored in the external memory medium or in the internal memory means; and prohibiting means for preventing the data transfer means from performing the transmission of image data and attribute information when the judging means finds no agreement.

In accordance with the first aspect of the present invention, the image creation program is inputted from the external memory medium into the main body of the apparatus. And, the image data is created in accordance with this program applied from the external memory medium. The created image data is stored in the internal memory means in the main body together with the attribute information of the program applied for creation of this image data. An image data is prevented from being transferred from the external memory medium to the internal memory means if an image creation program currently running in the main body is different from the image creation program used for creation of this image data stored in the external memory medium.

Furthermore, a second aspect of the present invention provides an external memory controller for an image creating device comprising:

image creation control means, provided in a main body of the apparatus, for creating an image data in accordance with an image creation program on the basis of operation signals supplied from a tablet and a switch;

internal memory means, provided in the main body, for storing the image data created by the image creation control means;

monitor means for displaying a visual image transformed from the image data;

external memory medium storing its own image creation program together with image data and attribute information;

external memory medium loading means for connecting the external memory medium to the main body so that the image creation program of the external memory medium can be run in the main body;

input means for inputting the image creation program and attribute information from the external memory medium to the main body;

memory control means for causing the internal memory means to store the attribute information of the image creation program supplied from the external memory medium in addition to the image data created by this image creation program;

data transfer means for controlling transmission of image data and attribute information between the external memory medium and the internal memory means:

judging means for making a judgment as to whether or not an image creation program currently running in the main body has the same attribute information as the attribute information of the image data stored in the external memory medium or in the internal memory means; and prohibiting means for preventing the data transfer means from performing the transmission of image data and attribute information when the judging means finds no agreement.

In accordance with the second aspect of the present invention, the image creation program is inputted from the external memory medium into the main body of the apparatus. And, the image data is created in accordance with this program applied from the external memory medium. The created image data is stored in the internal memory means in the main body together with the attribute information of the program applied for creation of this image data. An image data is prevented from being transferred from the external memory medium to the internal memory means if an image creation program currently running in the main body is different from the image creation program used for creation of this image data stored in the external memory medium. If the above programs agree with each other, the image data created can be reserved in the external memory medium together with the attribute information of the program used for creation of this image data.

Still further, a third aspect of the present invention provides an external memory controller for an image creating device comprising:

image creation control means, provided in a main body of the apparatus, for creating an image data in accordance with an image creation program on the basis of operation signals supplied from a tablet and a switch;

internal memory means, provided in the main body, for storing the image data created by the image creation control means;

monitor means for displaying a visual image transformed from the image data;

external program memory medium storing its own image creation program together with attribute information thereof;

first loading means for connecting the external program memory medium to the image creation control means so that the image creation program of the external program memory medium can be run in the image creation control means for creation of an image data;

external data memory medium storing individual image data together with their attribute information;

second loading means for connecting the external data memory medium to the internal memory means so that the image data in the external data memory medium can be written into the internal memory means;

input means for inputting the image creation program and attribute information thereof from the external program memory medium to the main body and for inputting the individual image data and their attribute information from the external data memory medium to the main body;

memory control means for causing the internal memory means to store the attribute information of the image creation program supplied from the external program memory medium in addition to the image data created by this image creation program;

data transfer means for controlling transmission of image data and attribute information between the external data memory medium and the internal memory means;

judging means for making a judgment as to whether or not an image creation program currently running in the main body has the same attribute information as the attribute information of the image data stored in the external data memory medium or in the internal memory means; and prohibiting means for preventing the data transfer means from performing the transmission of image data and attribute information when the judging means finds no agreement In accordance with the third aspect of the present invention, the image creation program is inputted from the external program memory medium into the main body of the apparatus. And, the image data is created in accordance with this program applied from the external program memory medium. The created image data is stored in the internal memory means in the main body together with the attribute information of the program applied for creation of this image data. An image data is prevented from being transferred from the external data memory medium to the internal memory means if an image creation program currently running in the main body is different from the image creation program used for creation of this image data stored in the external data memory medium. If the above programs agree with each other, the image data created can be reserved in the external data memory medium together with the attribute information of the program used for creation of this image data.

Moreover, in accordance with a fourth aspect of the present invention, it is preferable in the above third aspect of the present invention that the external data memory medium stores numerous image data created in accordance with a plurality of image creation programs different from each other, and each of the numerous image data is inputted from the external data memory medium to the internal memory means only when its attribute information is found to be agreeable with the currently running image creation program as a result of the judgment by the judging means.

In accordance with the fourth aspect of the present invention, the image creation program is inputted from the external program memory medium into the main body of the apparatus. And, the image data is created in accordance with this program applied from the external program memory medium. The created image data is stored in the internal memory means in the main body together with the attribute information of the program applied for creation of this image data. An image data is prevented from being transferred from the external data memory medium to the internal memory means if an image creation program currently running in the main body is different from the image creation program used for creation of this image data stored in the external data memory medium. On the other hand, the image data created can be reserved in the external data memory medium together with the attribute information of the program used for creation of this image data. Still further, when the image data has been previously created and stored in the external data memory medium, this image data can be inputted from the external data memory medium to the internal memory means only when an image creation program currently running in the main body agrees with the image creation program used for creation of this image data stored in the external data memory medium.

The above and other objects, features and advantages of the present invention will become more apparent from the following detailed description which is to be read in conjunction with the accompanying drawings.

DETAILED DESCRIPTION OF THE PREFERRED EMBODIMENTS

Hereinafter, preferred embodiments of the present invention will be explained in detail with reference to accompanying drawings.

1. FIRST EMBODIMENT 1.1. OVERALL SYSTEM CONSTITUTION

Figure 1:
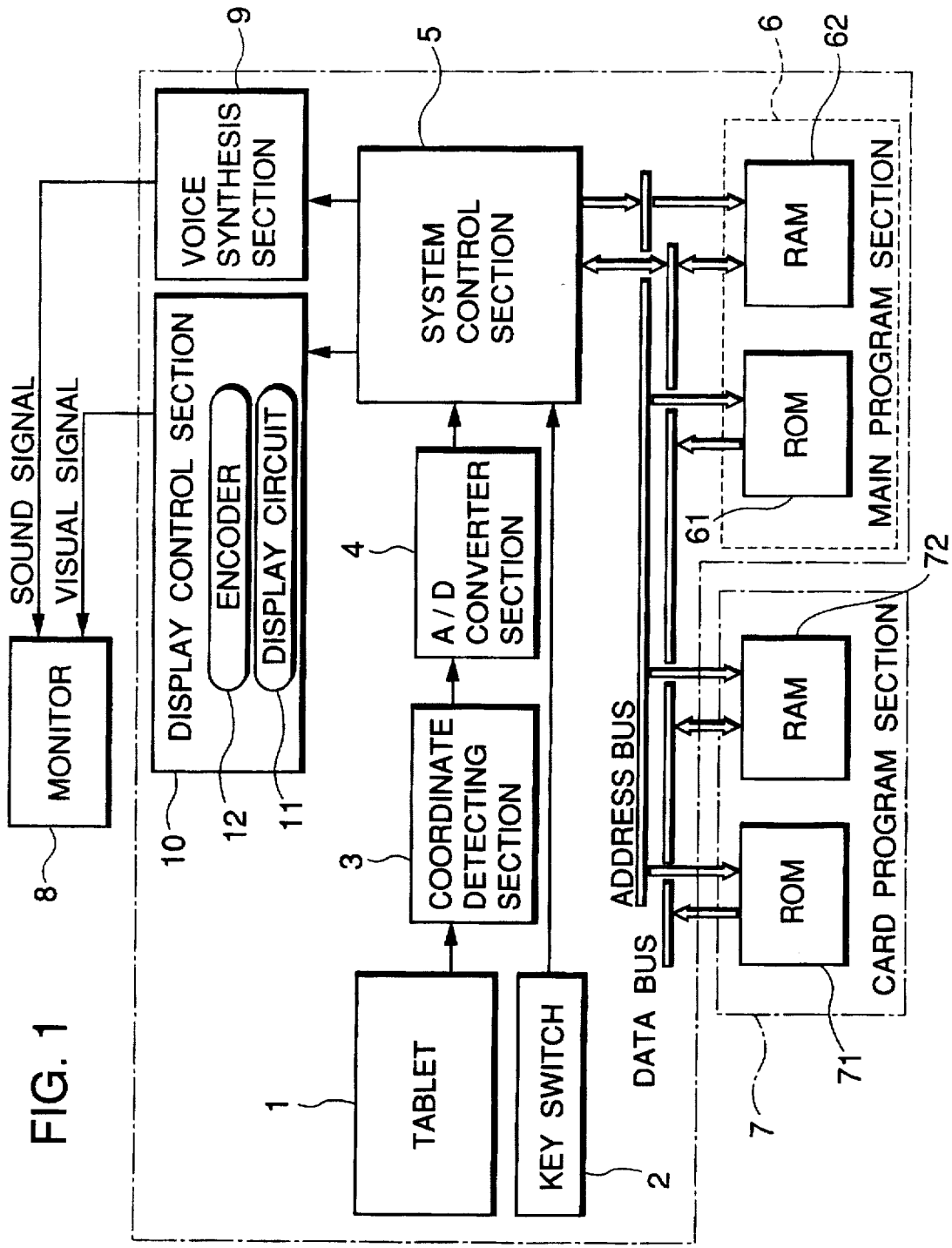
FIG. 1 is a schematic block diagram showing one embodiment of an image creation apparatus embodying the present invention.
Figure 2:
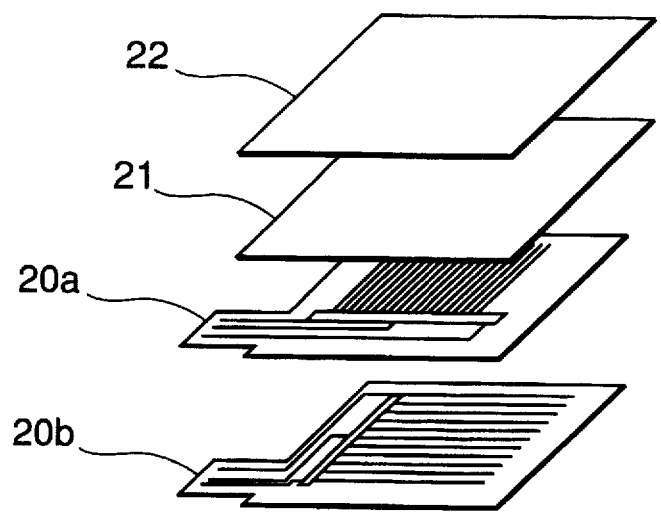
FIG. 2 is an exploded perspective view showing construction of a tablet.
Figure 3:
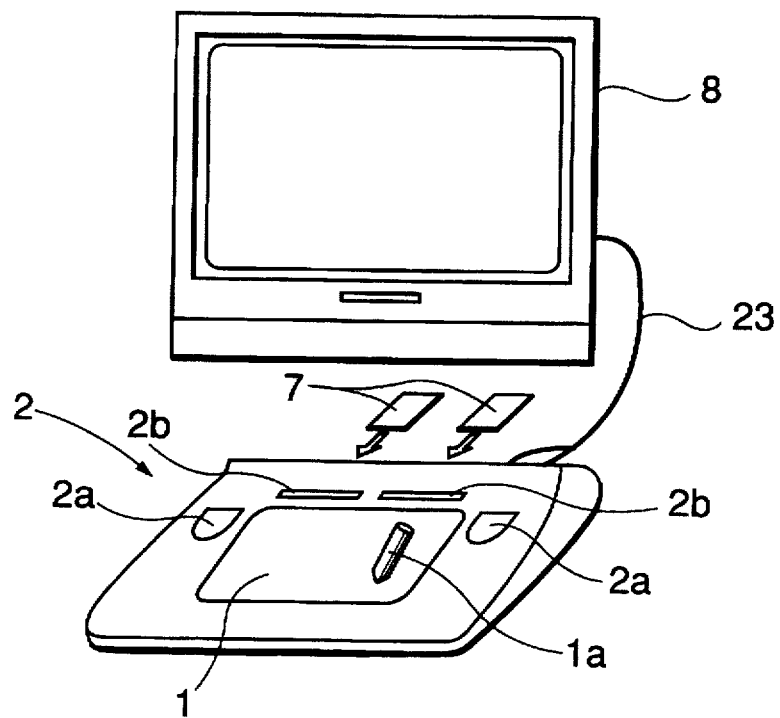
FIG. 3 is an appearance view showing the image creation apparatus connected with a monitor.

FIG. 1 is a schematic block diagram showing one embodiment of an image creation apparatus embodying the present invention. FIG. 2 is an exploded perspective view showing construction of a tablet. And, FIG. 3 is an appearance view showing the image creation apparatus connected with a monitor.

A tablet 1 comprises, as shown in FIG. 2, an X-coordinate detecting sheet 20a, a Y-coordinate detecting sheet 20b, a protecting sheet 21, and a decorative or panel sheet 22 laminated through appropriate spacers (not shown). An input pen 1a is used to point any place on the panel sheet 22. When depressed by this input pen 1a, the X-coordinate detecting sheet 20a contacts with the Y-coordinate detecting sheet 20b so as to form a resistance whose value corresponds to a coordinate position pointed by the input pen 1a.

The tablet 1 has a plotting region and an icon region provided in the periphery of the plotting region. The discrimination of whether the input information relates to plotting position or icon is judged by a system control section 5 using X- and Y-coordinate values inputted thereto.

A key switch 2 comprises fix keys 2a, 2a for finally fixing or deciding each operation and function keys 2b, 2b for selectively designating various functions which will be later explained in detail. Signals from these switches 2a, 2b are fed to the system control section 5. In this image creating apparatus, the coordinate designation is carried out by using the input pen 1a on the tablet 1 and is fixed upon depressing either one of the fix keys 2a, 2a. These fix keys 2a, 2a are symmetrically disposed on both right and left sides of the tablet 1 in view of easy and comfortable operation for any of right-handed and left-handed operators.

A coordinate detecting section 3 converts the resistant value determined by the tablet 1 into an analog voltage. This analog voltage is generated by supplying a constant current to the resistance determined by the tablet 1. Thus generated analog voltage is outputted as a coordinate position signal from the coordinate detecting section 3 to an A/D converter section 4. The A/D converter 4 transforms the analog signal into a digital signal.

A main program section 6, installed in the main body of the image creating apparatus, comprises a ROM 61 and a RAM 62. A card program section 7, detachably connected to the main body of the image creating apparatus through an appropriate installation or loading portion formed behind thereof (not shown), comprises a reloadable memory medium such as a ROM 71 or a RAM 72. This card program section 7 is generally constituted by an IC card or a memory card. The RAM 72 can be replaced by an EEPROM or a flush memory.

The ROM 61 in the main program section 6 stores an ordinary image creating program performing an ordinary plotting operation, a special image creating program allowing a special plotting operation, attribute information of these programs, an amusement program employing image creating functions, and characters needed.

The ROM 71 of the card program section 7 stores its own image creating program different from that of the ROM 61 of the main program section 6 together with its attribute information, so as to permit a different plotting operation by connecting this card program section 7 to the main body of the image creating apparatus.

The RAM 72 of the card program section 7 stores various data including image data created by plotting operation, other kinds of data produced by application programs, and data file administration data. The data file administration data comprises not only attribute information of cards but attribute information of individual data files stored in these cards. Each of these attribute information is constituted by a combination of figure and symbol, or the like.

The system control section 5 controls reservation of the above data stored in the RAM 72 of the card program section 7 in accordance with the program stored in the main program section 6.

Furthermore, the system control section 5 controls reading-out operation of the data reserved in the RAM 72 of the card program section 7 in accordance with each application program. In this case, judgment is made as to whether or not the attribute information of each data file agrees with the attribute information of the application program currently running, so that only the data created by the same application program as the application program currently running can be read out.

Moreover, the system control section 5 controls erasing of the data reserved in the RAM 72 of the card program section 7 in accordance with the program stored in the main program section 6, wherein the attribute information of the above data is nullified but the data itself is left there until it is replaced by other data.

The system control section 5 not only administrates an overall operation of the system but executes communication with the main program section 6 and the card program section 7 through address bus and data bus for transmission of above image creation programs and data. Furthermore, the system control section 5 performs image creation on the basis of coordinate position signals inputted from A/D converter 4 and switch signals inputted from the key switch section 2 in accordance with the image creation program. The system control section, then, outputs necessary data to a voice synthesis section 9 and a display control section 10 which will be described later.

The image data, which has been created or is being created, is stored in the RAM 62 of the main program section 6 or the RAM 72 in the card program section 7 in accordance with the input command from the tablet 1 together with the attribute information of the image creation program used for the creation of this image data.

The system control section 5 has a function for making a judgment as to whether or not a concerned image data is created by the image creation program currently running by comparing the attribute information of the currently running image creation program and the attribute information of this concerned image data. Furthermore, the system control section 5 has a function for prohibiting data transfer of the image data when it is found from the above judgment that this image data has been created by another program.

The voice synthesis section 9 generates a sound signal transformed from a sound data transmitted from the main program section 6 and the card program section 7 through the system control section 5, so as to output this sound signal to a monitor 8. The display control section 10, including a display circuit 11 and an encoder 12, generates a visual or video signal transformed from an image data transmitted from the system control section 5. The visual or video signal is supplied to the monitor 8 through a video cable 23.

With the above arrangement a user of the image creating apparatus can perform an input operation for plotting operation and the like by use of the key switch section 2 and the input pen 1a of the tablet 1, following icon and character information displayed on the monitor 8 and sound information generated from the voice synthesis section 9.

1.2. IMAGE CREATING FUNCTIONS

Various functions for creating images in accordance with the above image creating apparatus are listed as follows:

Pen function for drawing a line of a desired color in accordance with the coordinate position data inputted from the tablet 1.

Paint function for painting an area encircled by a designated frame in a desired color.

Trimming function for tracing a designated frame in a desired color.

Erasing function for erasing a plotted image by a desired line thickness.

Color selecting function for selecting a desired color for use in the above pen function, paint function, trimming function or the like.

Palette function for designating predetermined number of colors used for the above color selecting function among all the colors displayable on the screen in accordance with the main program.

Color search function for specifying a desirable color from the Palette in each position on the display screen.

Stamp function for locating, at a desired position on the screen, an illustration or the like which is stored beforehand in the ROM 61 of the main program section 6 or in the ROM 71 of the card program section 7.

Clear function for deleting the illustration or the like and leaving only a background color on the screen.

Undo function for canceling a preceding operation.

Plotting function for depicting a fundamental configuration such as a straight line, a rectangle, and a circle by simply designating position and magnitude thereof.

Editing function for performing an image editing operation including copy, shift, and enlargement of an illustration on the screen.

Image data file editing function for reserving a created illustration into the memory medium such as the memory card of the card program section 7, for reading out the reserved illustration, for deleting a part of the reserved illustration, and for displaying a list.

Each of these functions is selected by using the key switch section 2 or the icon region of the tablet 1.

Next, these functions will be explained one by one with reference to the flowcharts of FIGS. 4 through 15.

Figure 4:
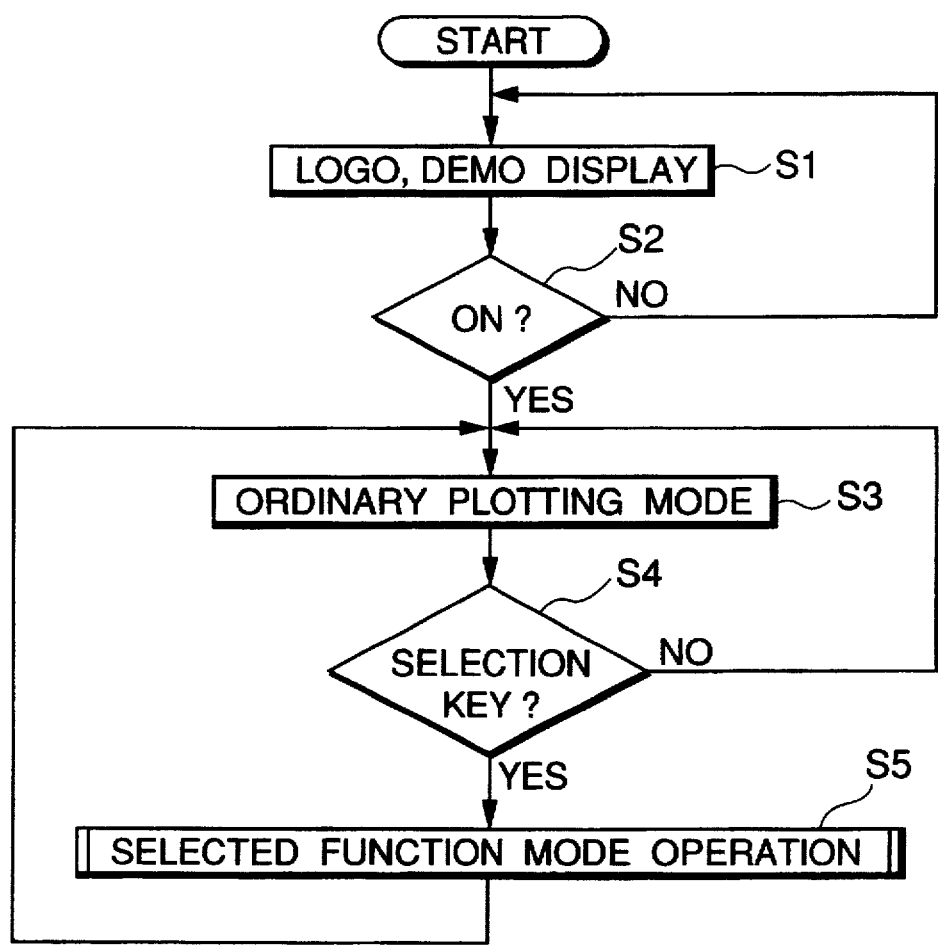
FIG. 4 is a flowchart showing an operation of the image creation apparatus.
Figure 5:
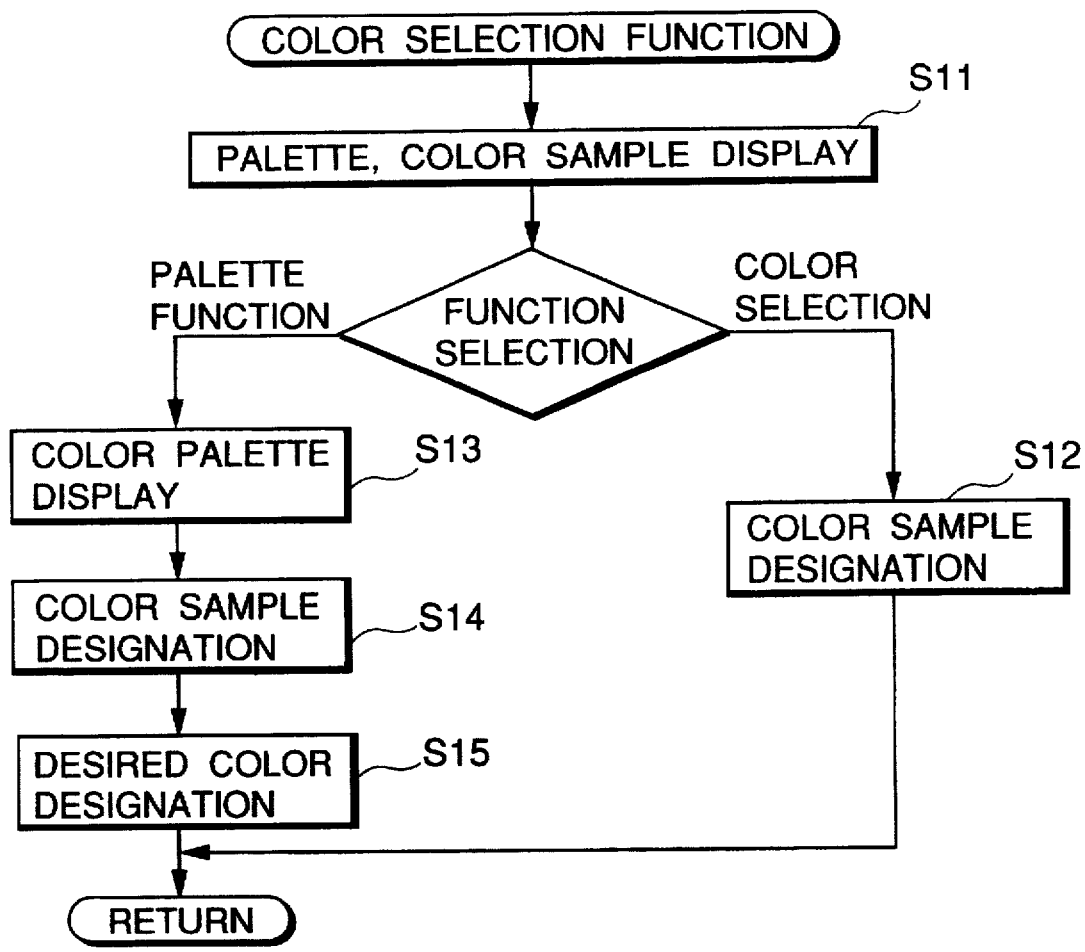
FIG. 5(A) is a flowchart showing a color selection function and a palette function.
FIG. 5(B) is a view showing a display screen of the monitor when the palette function is selected.
Figure 5:
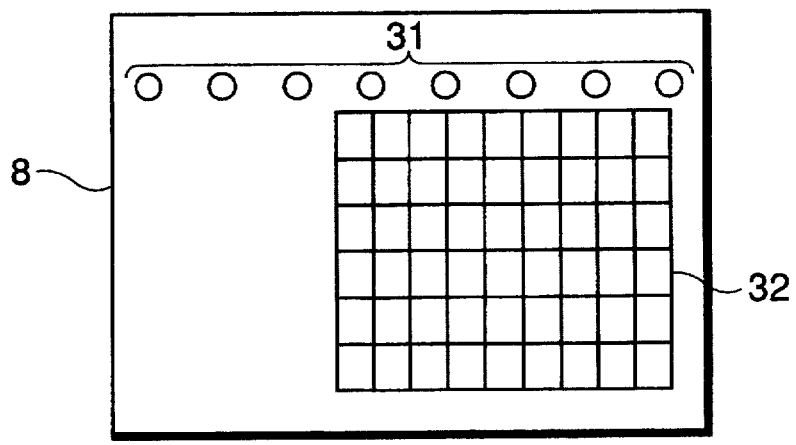

First of all, as shown in Step S1 of FIG. 4, logo and demo screens are displayed upon turning on of an electric power source. This condition continues until the input operation is executed by the fix key 2a or the tablet 1, as shown in Step S2. If any input operation is performed, i.e. if the judgment is YES in Step S2, an ordinary plotting mode (i.e. an initial screen) is initiated in Step S3. When the selection key 2b is depressed (i.e. YES in Step S4), the system control section 5 proceeds to a selected mode operation of Step S5. If the selection key 2b is not depressed (i.e. NO in Step S4), the ordinary plotting mode is repeated continuously in Step S3.

1.2.1. COLOR SELECTING FUNCTION AND PALETTE FUNCTION

Next, the color selecting function and palette function will be explained with reference to FIGS. 5(A) and 5(B).

When the color selecting function is selected by the selection key 2b, icons of palette function and predetermined number of color samples selected by the palette function are both displayed at appropriate portions on the screen as shown in Step S11. When all icon of a desired color sample is selected by use of the tablet 1, the color to be used is designated by depressing the fix key 2a as shown in Step S12. On the other hand, when an icon of the palette function is selected by the coordinate designation of the tablet 1 and the fix key 2a, a color palette 32 including 144 kinds of different colors are displayed together with the color samples 31 on the screen of the monitor 8, as shown in Step S13. Next, a color sample 31 to be replaced by a new color is designated in Step S14. Subsequently, a desirable color is newly designated from the color palette 32 in Step S15. The color designated in Step S15 is then displayed at an appropriate position on the upper edge of the screen. By the way, the renewal of the color samples can be also carried out by varying the mixing ratio of three primary colors, wherein each ratio of red, green, and blue is designated by the tablet 1.

Furthermore, the color samples include some fluorescent colors, which are mainly used to control each of hue, chroma, and brightness, or their combination. For example, 8-grade variation per second will be generated to a certain color for realistically representing a flame of a candle.

1.2.2. PEN FUNCTION

Figure 6:
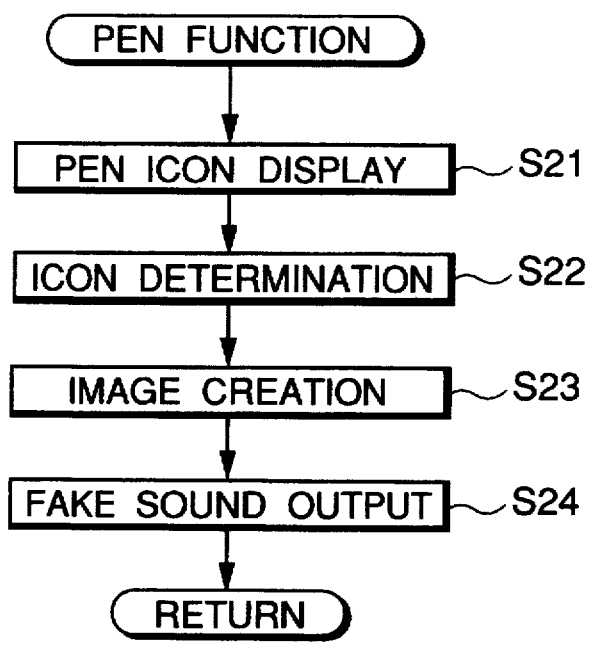
FIG. 6 is a flowchart showing a pen function.

Next, the pen function will be explained with reference to a flowchart of FIG. 6. When the pen function is selected by the selection key 2b, a plurality of icons representing a predetermined number of different line thicknesses of a pen are displayed on the screen in Step S21. The operator can select a desirable line thickness by pointing the corresponding icon by use of the input pen 1a, and can finally determine the line thickness to be used by depressing the fix key 2a as shown in Step S22. Then, the operator can execute the image creating operation as shown in Step S23, wherein the line plotting is carried out by drawing a desired line using the input pen 1a while continuously depressing the fix key 2a. Namely, a coordinate position on the screen corresponding to the pressing point of the input pen 1a on the tablet 1 is colored by a desired color which is selected in accordance with the color selecting function.

Furthermore, a fake sound is outputted during the line plotting operation as shown in Step S24. This fake sound is produced in the voice synthesis section 9 in such a manner that a different sound can be produced in accordance with the line thickness so as to bring realistic feeling.

1.2.3. PAINT FUNCTION

Figure 7:
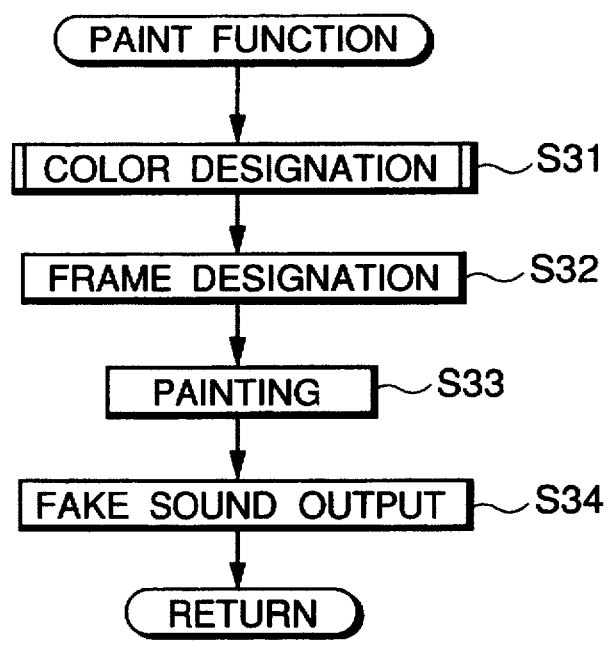
FIG. 7 is a flowchart showing a paint function.

Next, the paint function will be explained with reference to the flowchart of FIG. 7.

After completing the color designation in accordance with the above-described color selecting function in Step S31, a frame specifying an area to be painted is designated in Step S32. In this Step S32, any area encircled by the frame created in accordance with the pen function can be specified as a paint area through the coordinate input operation by use of the tablet 1. This paint area is then finally fixed by depressing the fix key 2a. Subsequently, the designated paint area is fully painted in Step S33. At the same time, in Step S34, the voice synthesis section 9 generates a fake sound. With this fake sound, the operator can wait for the completion of the painting operation without feeling meaningless blank rather having a pleasant time.

1.2.4. TRIMMING FUNCTION

Figure 8:
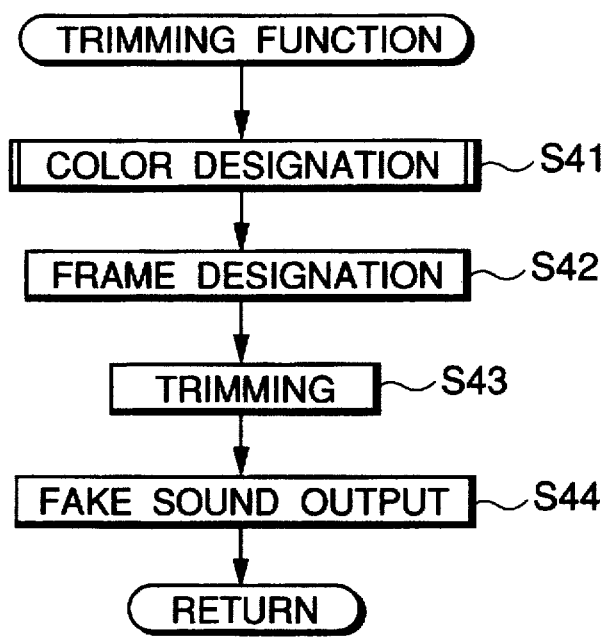
FIG. 8 is a flowchart showing a trimming function.

The trimming function will be explained with reference to the flowchart of FIG. 8.

After completing the color designation to the line plotted in accordance with the above-described pen function in Step S41, a frame to be colored is designated in the same manner as the paint function in Step S42. Subsequently, an inside zone of the designated frame is trimmed by a predetermined width in Step S43. Furthermore, in Step S44, the voice synthesis section 9 generates a fake sound in the same manner as the above described paint function.

1.2.5. STAMP FUNCTION

Figure 9:
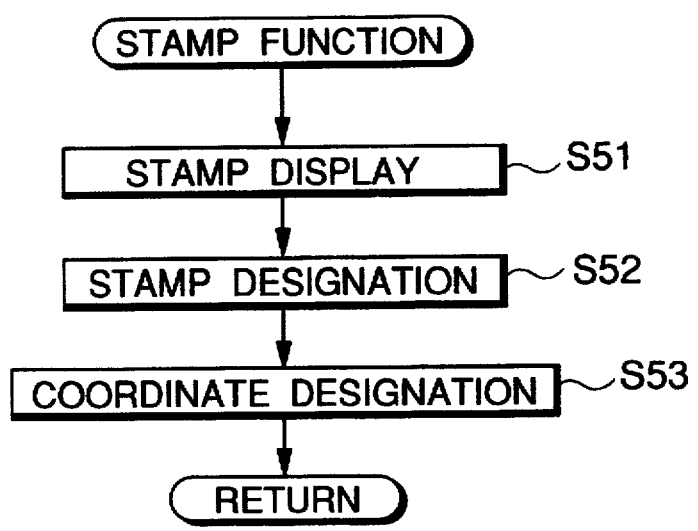
FIG. 9 is a flowchart showing a stamp function.

The stamp function will be explained with reference to the flowchart of FIG. 9. If the stamp function is selected by the selecting key 2b, a plurality of stamp icons representing various characters are displayed on the screen in Step S51. The operator selects a desired stamp by using the tablet 1 and the fix key 2a in Step S52. Thus, the selected stamp is located at a position on the screen corresponding to the coordinate position of the input pen 1a on the tablet 1. Then, the operator shifts the input pen 1a on the tablet 1 and depresses the fix key 2a at a desired place to finally determine the position of the stamp to be placed, as shown in Step S53. In this case, a fake sound is generated upon depression of the fix key 2a so that the operator can feel as if he/she actually stamps.

In accordance with the clear function, all the illustrations displayed on the screen can be deleted so as to leave only a background color on the screen. Furthermore, if the undo function is selected by the selecting key 2b, the operation performed immediately before can be canceled so that the screen reverts to the preceding condition.

1.2.6. PLOTTING FUNCTION

Figure 10:
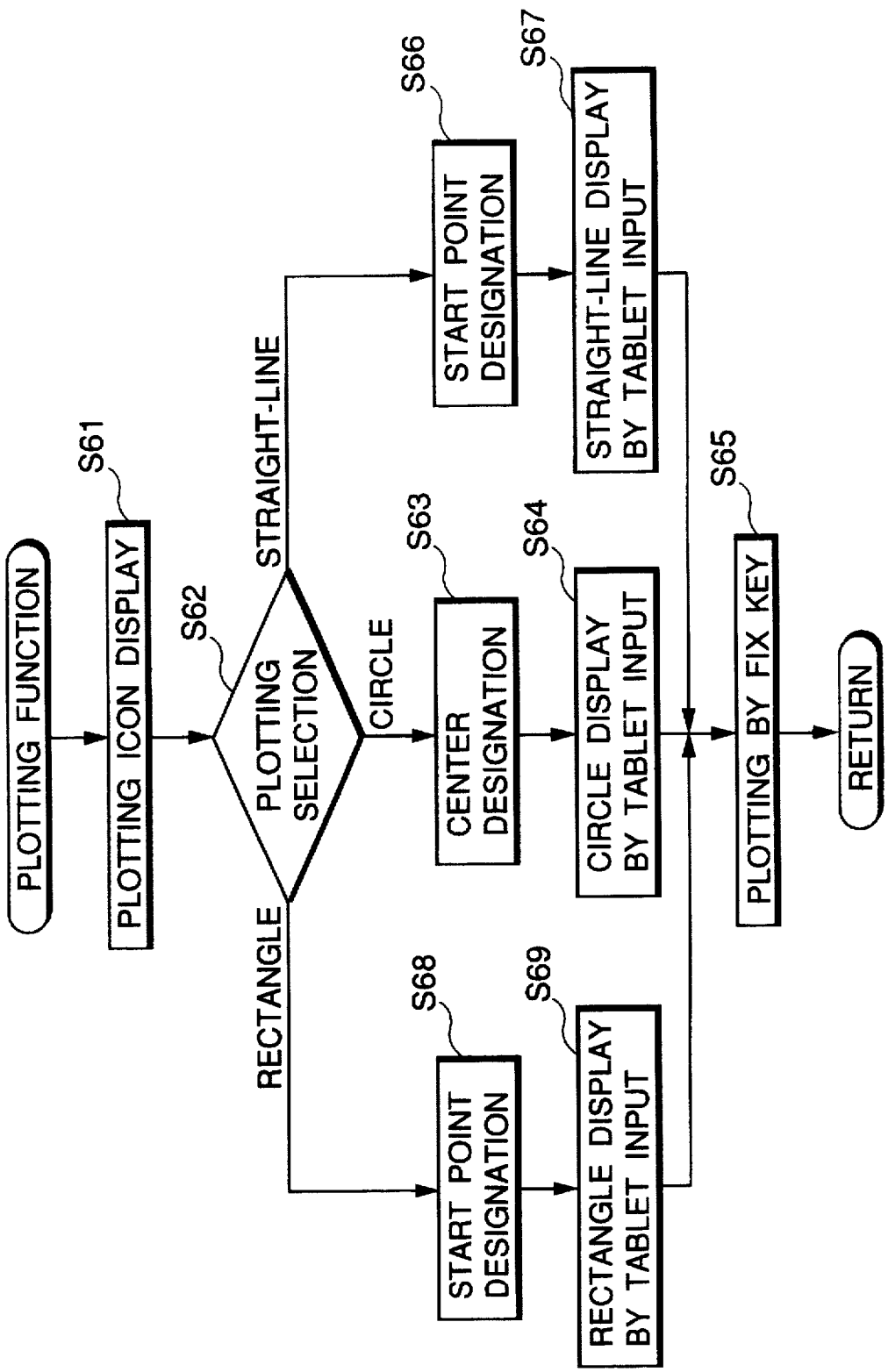
FIG. 10 is a flowchart showing a plotting function.

The plotting function will be explained with reference to FIG. 10. If the plotting function is selected by the selecting key 2b, a plurality of icons representing various configurations are displayed on the screen in Step S61. Then, in Step S62, the operator selects a desired configuration referring to these icons through the coordinate input of the tablet 1 and the fix key 2a.

If the operator selects a circle, the program proceeds to Step S63 to designate a center position of the circle through the coordinate input of the tablet 1 and the fix key 2a. Subsequently, in Step S64, the operator designates a desired point through the coordinate input of the tablet 1, so that a circle passing through this designated point can be displayed. Thereafter, as shown in Step S65, the circle is plotted on the screen upon depression of the fix key 2a.

If the operator selects a straight line, the program proceeds to Step S66 to designate one point through the coordinate input of the tablet 1 and the fix key 2a. Subsequently, in Step S67, the operator designates another point through the coordinate input of the tablet 1, so that a straight line passing through the above designated two points can be displayed. Thereafter, in Step S65, the straight line is plotted on the screen upon depression of the fix key 2a.

If the operator selects a rectangle, the program proceeds to Step S68 to designate one point through the coordinate input of the tablet 1 and the fix key 2a. Subsequently, in Step S69, the operator designates another point through the coordinate input of the tablet 1, so that a rectangle whose diagonal is defined by the above designated two points can be displayed. Thereafter, in Step S65, the rectangle is plotted oil the screen upon depression of the fix key 2a.

In this plotting function, it will be preferable to generate a voice message such as "Okay" and "No Good" from the voice synthesis section 9 in each coordinate designation of respective points in order to facilitate the plotting operation and prevent any error.

1.2.7. EDITING FUNCTION

Figure 11:
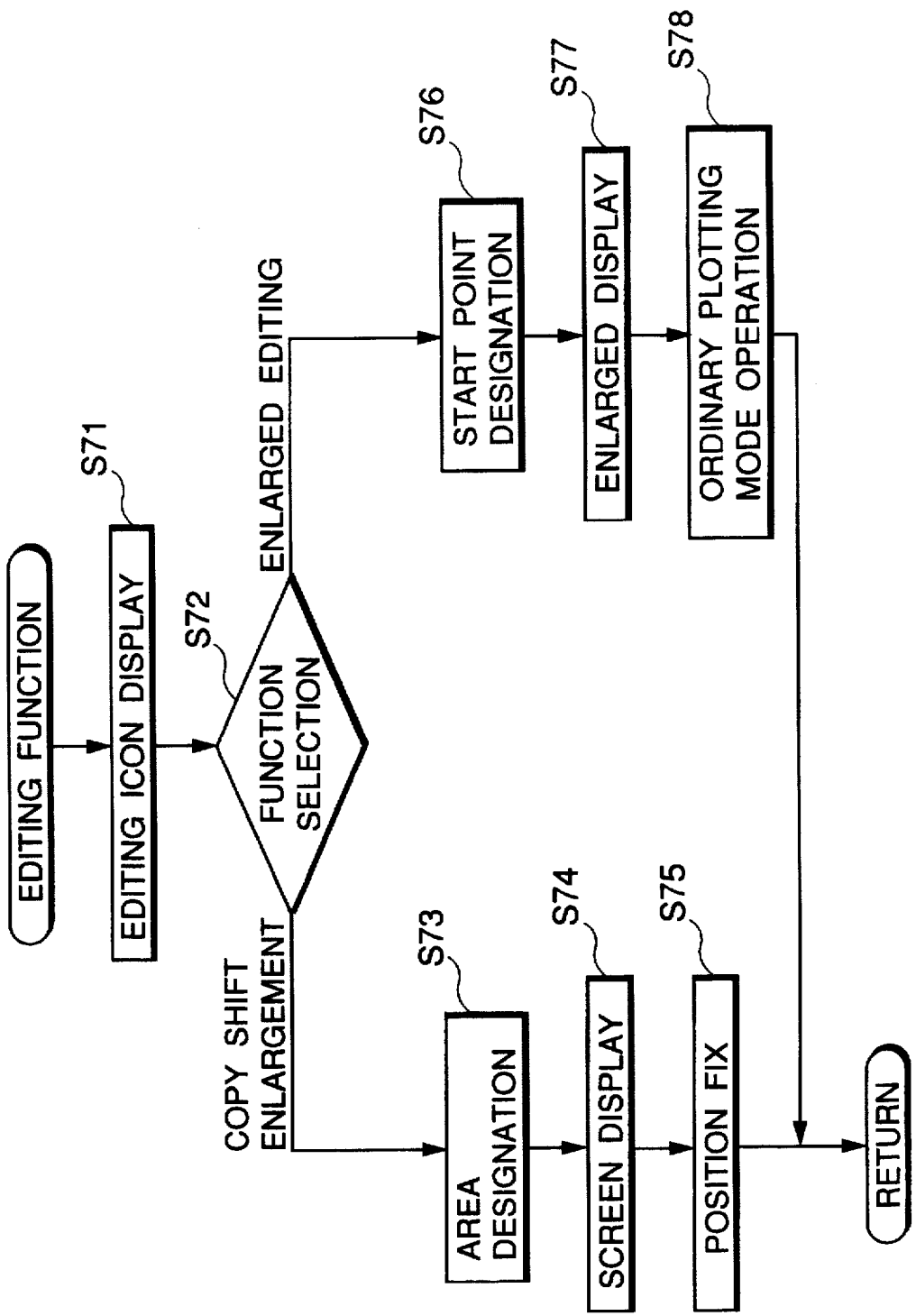
FIG. 11 is a flowchart showing an editing function.
Figure 12:
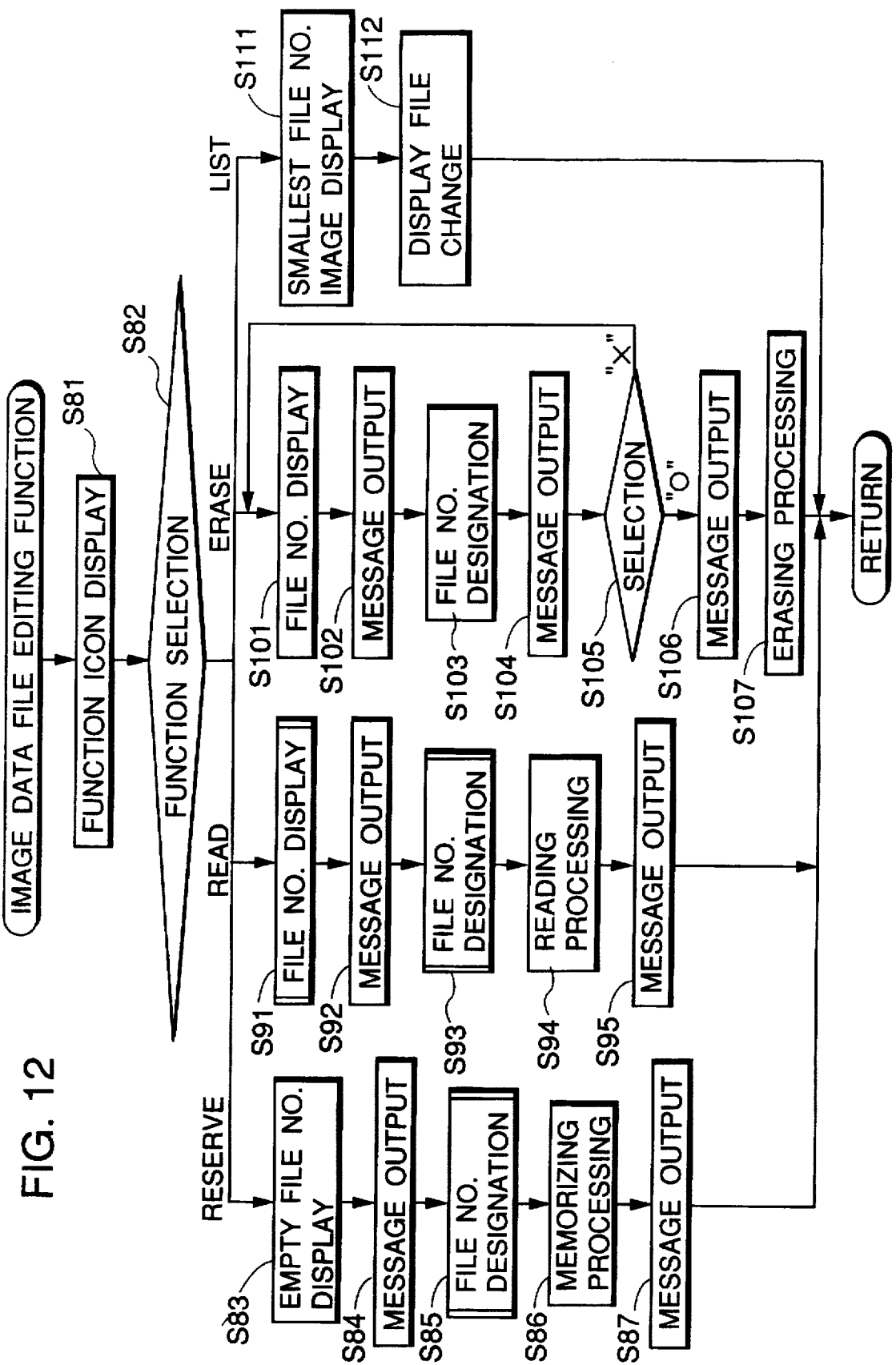
FIG. 12 is a flowchart showing an overall operation of the image data file editing function.

The editing function will be explained with reference to FIG. 11. The editing function consists of plurality of functions such as copy, shift, and enlargement. When the editing function is selected by the selecting key 2b, icons representing these functions are displayed on the screen in Step S71. Then, in Step S72, the operator selects an icon corresponding to a desired function through the coordinate input of the tablet 1 and the fix key 2a. In this case, a voice message such as "Copy", "Warp", "Up", and "Zoom" can be generated upon the selection of the icon.

In case of the copy function, the operator designates two points in Step S73 through the coordinate input of the tablet 1 and the fix key 2a, in order to specify a rectangular copy area having a diagonal defined by these two designated points. This copy area is then displayed at a point on the screen corresponding to the position of the input pen 1a of the tablet 1, in Step S74. This copy area can be moved around in the screen in accordance with the shift movement of the input pen 1a on the tablet 1. The position of the copy area is finally determined in Step S75 upon depression of the fix key 2a. Thus, the copy operation is completed.

In case of the shift function, the operator designates two points in Step S73 in the same manner as in the copy function, in order to specify a rectangular shift area having a diagonal defined by the designated two points. This shift area is then displayed at a point on the screen corresponding to the position of the input pen 1a of the tablet 1, in Step S74. This shift area can be moved around in the screen in accordance with the shift movement of the input pen 1a on the tablet 1. The position of the shift area is finally determined in Step S75 upon depression of the fix key 2a. Thus, the shift operation is completed.

In case of the enlargement function, the operator designates two points in Step S73 in the same manner as in the copy function, in order to specify a rectangular area having a diagonal defined by the designated two points. This specified area is then enlarged twice. Thereafter, the enlarged area is moved around in the screen in accordance with the shift movement of the input pen 1a on the tablet 1. Thereafter, the position of the enlarged area is finally determined in Step S75 upon depression of the fix key 2a. Thus, the enlargement operation is completed.

In these copy, shift, and enlargement functions, it will be preferable to generate a voice message such as "Okay" and "No Good" from the voice synthesis section 9 in each coordinate designation of respective points in order to facilitate these editing operations and prevent any error.

If the enlarged editing function is selected in Step S72, the program proceeds to Step S76 wherein the operator designates a position through the coordinate input of the tablet 1 and the fix key 2a. Upon this position designation, a predetermined area having its center on the designated position is enlargedly displayed on the screen in Step S77. Then, in Step S78, the ordinary plotting mode operation including pen and other functions is executed with respect to the illustration corresponding to the enlarged area.

1.2.8. IMAGE DATA FILE EDITING FUNCTION

The image data file editing function will be explained with reference to FIGS. 12 through 15.

The image data file editing function consists of a plurality of functions such as reserve, reading-out, erase, and list functions.

When the image data file editing function is selected by the selecting key 2b, some icons representing respective functions are displayed on the screen in Step S81. Then, in Step S82, the operator selects an icon corresponding to a desired function through the coordinate input of the tablet 1 and the fix key 2a.

If the operator selects the reserve function, the file number of an empty image data file having sufficient memory capacity is displayed in Step S83 in order to store the image data of the created illustration into the RAM 72 of the card program section 7. In this case, the system control section 5 takes account of the attribute information of each image data for differentiating each image data file by color. For example, red is applied to the image data file which has been created and reserved by the application program currently running. Yellow is applied to the image data file which has been created and reserved by other application programs. And, gray is applied to the image data file which is empty or whose content is erased.

Subsequently, in Step S84, a voice message recommending the file selection is outputted from the voice synthesis section 9. Then, in Step S85, an image data file number is designated through the coordinate designation of the tablet 1 and the fix key 2a.

Figure 13:
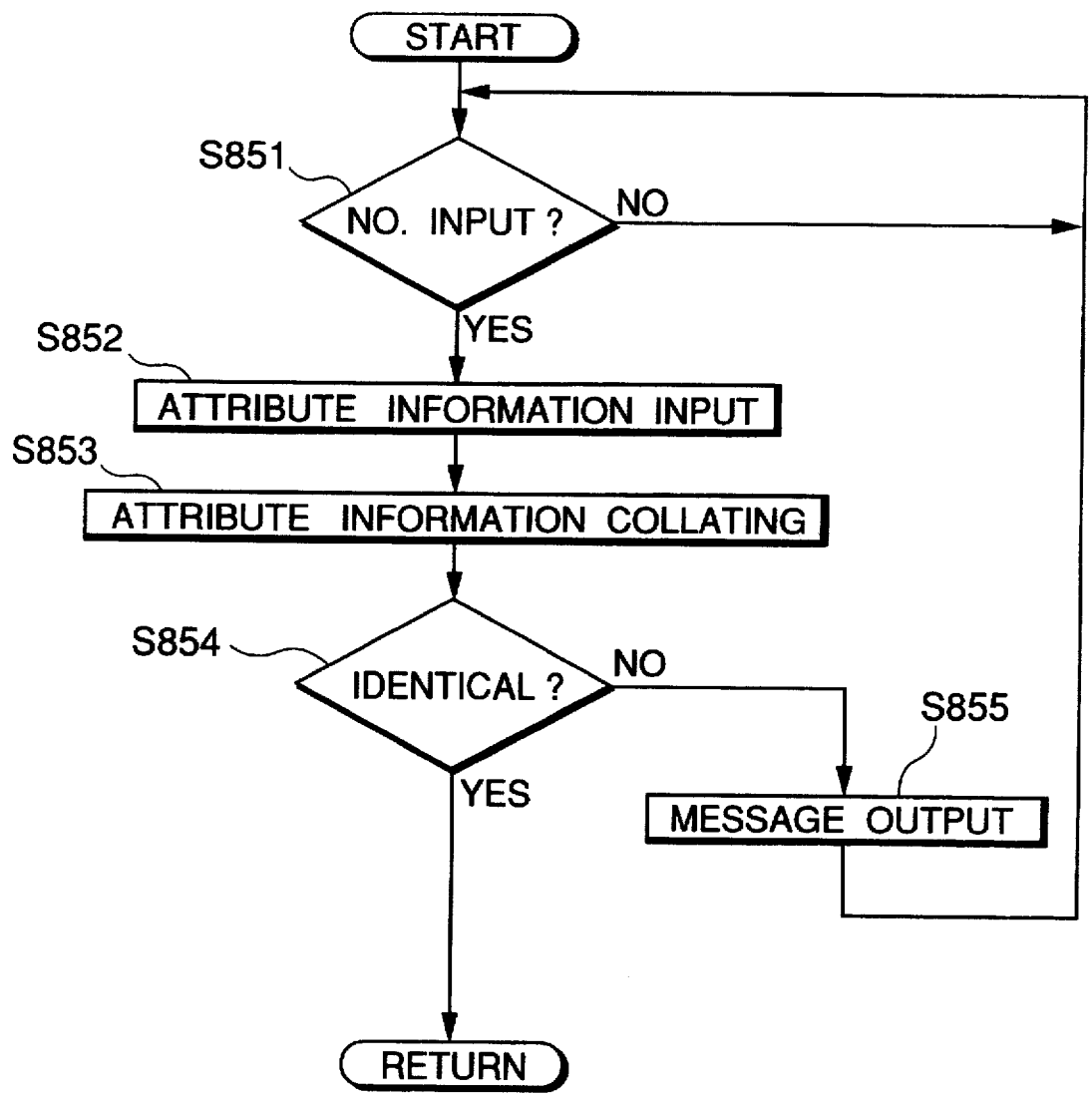
FIG. 13 is a flowchart showing a subroutine of executing file number designation defined by Step S85 of FIG. 12.
Figure 14:
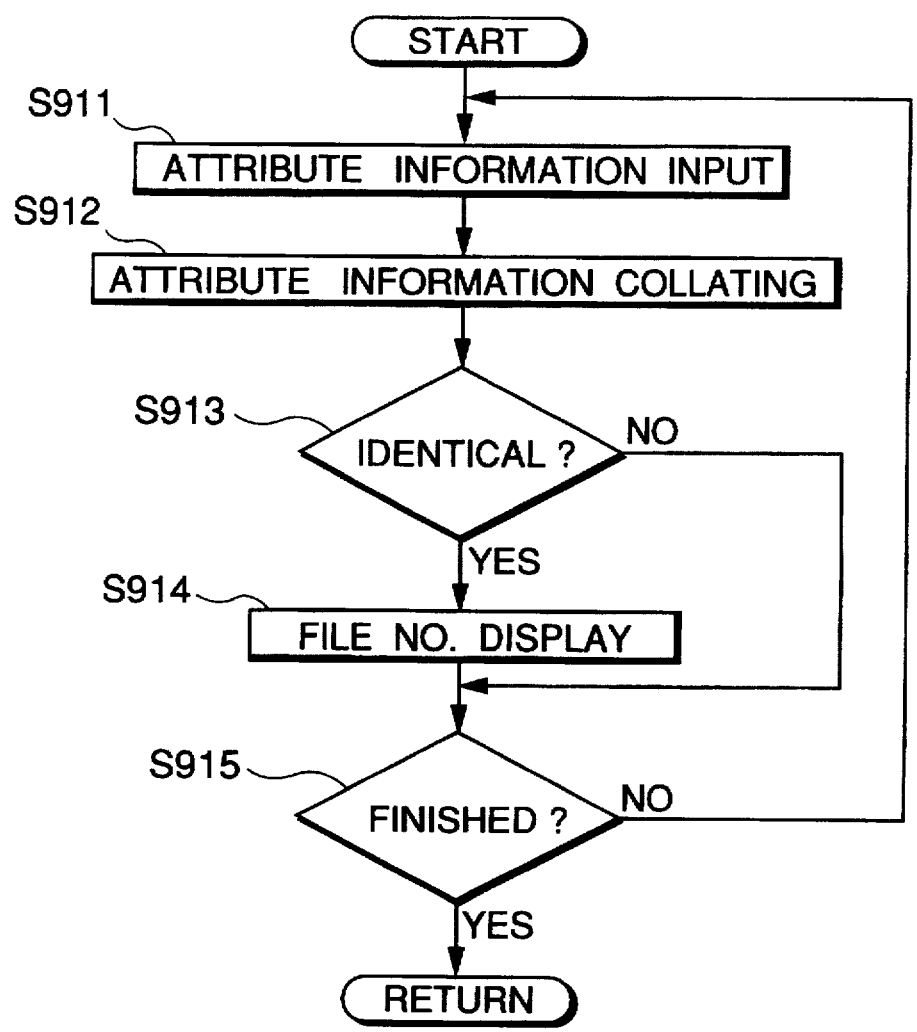
FIG. 14 is a flowchart showing a subroutine of executing file number display defined by Step S91 of FIG. 12.
Figure 15:
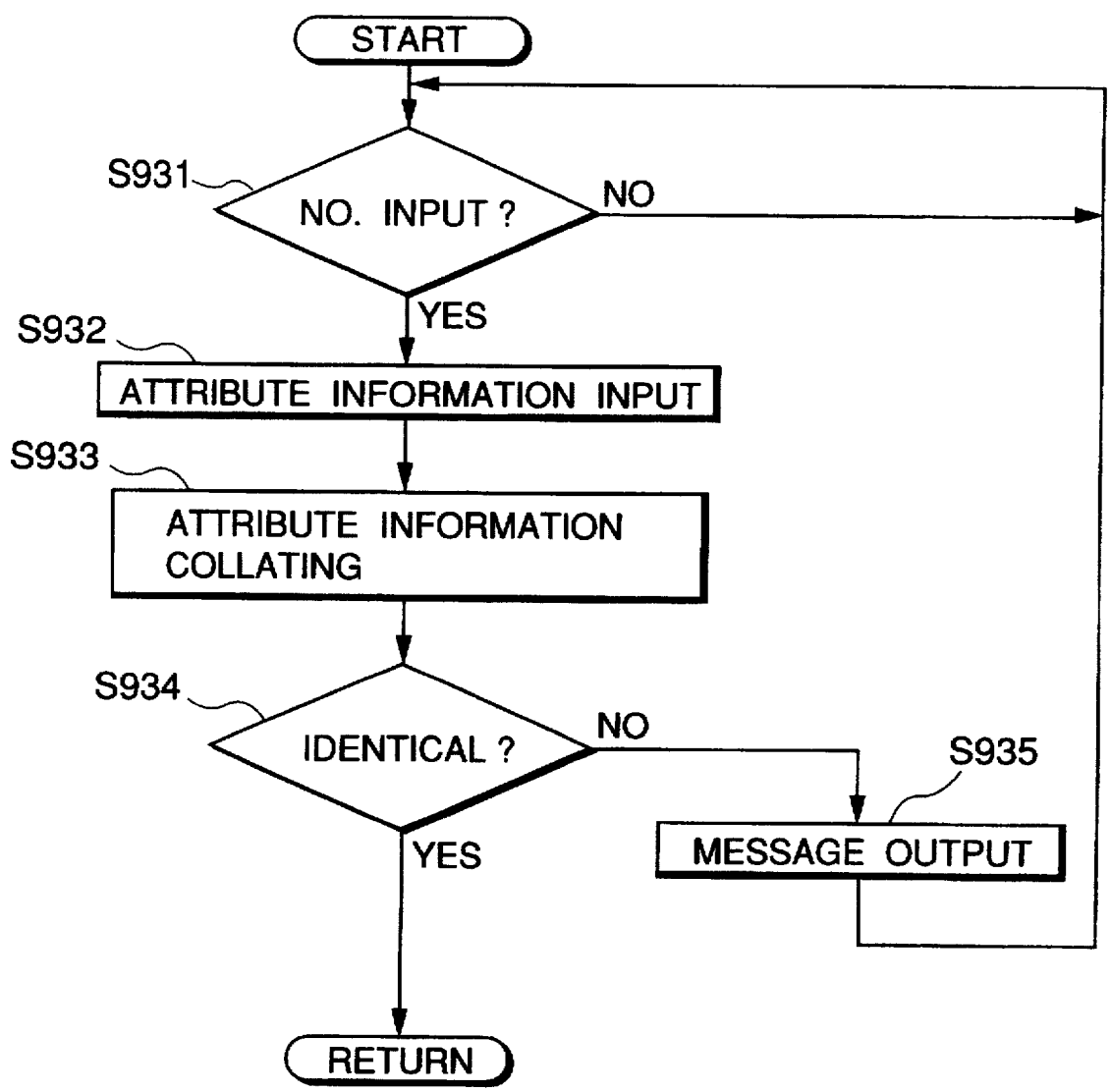
FIG. 15 is a flowchart showing a subroutine of executing file number designation defined by Step S93 of FIG. 12.

The Step S85 is now explained in detail with reference to the subroutine of FIG. 13. First of all, a judgment is made in Step S851 as to whether or not the number of an image data file is inputted. If the judgment is YES in Step S851, the program proceeds to Step S852 to input an attribute information of the inputted image data file. Then, in Step S853, the attribute information is collated with the attribute information of the illustration to be reserved. If they disagree with each other (NO in Step S854), a caution message is outputted in Step S855 and the program returns to Step S851. On the contrary, if they agree with each other (YES in Step S854), the program returns to Step S86 of FIG. 12 to store this image data and its attribute information into the RAM 72 of the card program section 7. After finishing the storing processing of Step S86, a voice message such as "Finished" is generated from the voice synthesis section 9 in Step S87.

In this case, the application program only creates the attribute information relating to the reservation. The main program reserves the image data and its attribute information. By the way, if an image data file which has been created and reserved by another application program is mistakenly designated in Step S85, this embodiment automatically denies this designation as an error.

In this case, it will be possible to automatically change the file number to the image data file created by the same application program and notify the operator of this change. In the case where an image data is newly reserved, an image data file which is empty or whose content is erased can be designated.

When the operator selects the reading-out function, the file number of an available image data file is displayed on the screen in Step S91. This Step S91 will be explained in detail with reference to the flowchart of FIG. 14. First of all, in Step S911, an attribute information of the image data file is inputted. Then, in Step S912, the attribute information of the image data file is collated with the attribute information of the currently running application program. If they disagree with each other (NO in Step S913), the program proceeds to Step S915. On the contrary, if they agree with each other (YES in Step S913), the concerned file number is displayed in Step S914. Then, a judgment is made in Step S915 as to whether or not the attribute collation has been finished with respect to all the attribute information. If the judgment is NO in Step S915, the program returns to Step S911 to repeat the same procedure. If the judgment is YES in Step S915, the program returns to Step S92 to cause the voice synthesis section 9 to generate a voice message recommending the file selection.

Next, in Step S93, a desirable image data file number to be read out is designated through the coordinate designation of the tablet 1 and the fix key 2a. This Step S93 will be explained in detail with reference to the subroutine of FIG. 15. First of all, a judgment is made in Step S931 as to whether or not the number of an image data file is inputted. If the judgment is YES in Step S931, the attribute information of this image data file is inputted in Step S932. Then, in Step S933, the attribute information of the image data file is collated with the attribute information of the currently running application program. If they disagree with each other (NO in Step S934), the program proceeds to Step S935 to generate a caution message and returns to Step S931. On the contrary, if they agree with each other (YES in Step S934), the program returns to Step S94 of FIG. 12 to read out the image data stored in the RAM 72 of the card program section 7. Thus, the illustration read out is displayed on the screen. After finishing the reading-out processing of Step S94, a voice message such as "Finished" is generated from the voice synthesis section 9 in Step S95. The application program carries out this reading-out operation of the reserved data.

If the operator selects the erasing function, the system control section 5 differentiates image data files in view of their attribute information in Step S101. Namely, the file number of an image data file which has been created and reserved by the currently running application program is displayed in red. The file number of an image data file which has been created and reserved by another application program is displayed in yellow. And, other file numbers of the remaining image data files are not displayed. In Step S102, a voice message recommending the file selection is generated from the voice synthesis section 9.

Thereafter, in Step S103, the operator designates the file number of an image data file to be erased through the coordinate input of the tablet 1 and the fix key 2a. An illustration corresponding to the designated image data file is displayed on the screen, together with a character message such as "This illustration will be erased. OK ?" and icons "o" and "x" used for replying to this message. The voice synthesis section 9 generates a voice message including the same content as the character message. (Step S104)

If the illustration having been created by another application program is selected or if the illustration created by the application program during the operation of the main program is selected, no display of the illustration is carried out and only the name of the application program is displayed on the screen. The application program name cannot be erased.

Thereafter, in Step S105, a judgment is made whether the operator designates the icon "o" or "x" through the coordinate input of the tablet 1 and the fix key 2a. If the icon "o" is selected in Step S105, a voice message such as "Wait a moment, please" is generated in Step S106. During the generation of the voice message, the erasing processing is carried out in Step S107 to erase the image data file corresponding to the illustration displayed on the screen. On the other hand, if the icon "x" is selected in Step S105, the program returns to Step S101.

If the operator selects the listing function, an illustration corresponding to the smallest image data file number, storing the image data in the RAM 72 of the card program section 7, is displayed at one edge on the screen in Step S111. Then, in Step S112, the illustration to be displayed is changed successively with incrementing image data file number.

In this case, the system control section 5 takes the attribute information into consideration. Namely, an illustration created and reserved by the main program is displayed directly on the screen, as well as an illustration reserved by the currently running application program. On the contrary, in case of an illustration reserved by another application program, only the name of this illustration is displayed.

In this image data file editing function, an operation error may induce a serious accident of mistakenly erasing necessary image data. It is, therefore, preferable to cause the voice synthesis section 9 to generate a voice message such as "Prohibited" or "This key is not available".

In accordance with the present invention, each of the reserve, reading-out, and erasing functions can be carried out only when the currently running program is identical with the application program used for creation of the image data. Thus, not only error operation can be easily prevented but unfair use of sensitive image data can be surely avoided.

By the way, it is needless to say that the card program section 7 comprising the RAM 72 is not limited to the memory medium such as an IC card and a memory card. For example, a reloadable memory medium such as a magnetic disk and an optical disk can be also used as the card program section 7.

2. SECOND EMBODIMENT

Figure 16:
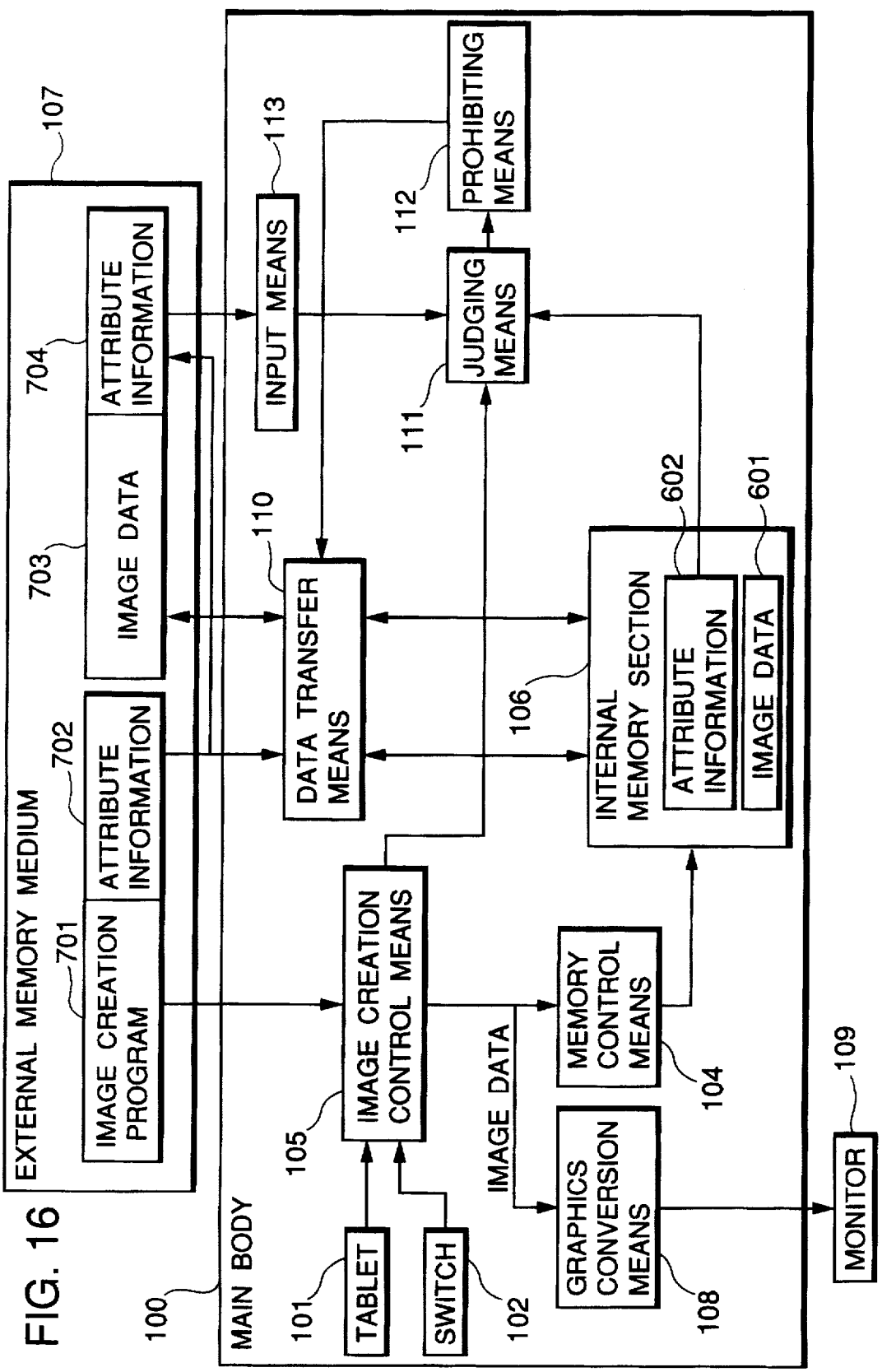
FIG. 16 is a block diagram showing another embodiment of the image creating apparatus in accordance with the present invention.

Next, a second embodiment of the image creating apparatus in accordance with the present invention will explained with reference to FIG. 16.

An image creation control means 105, installed in a main body 100 of the image creating apparatus, is associated with an external memory medium 107 which stores an image creation program 701 and its attribute information 702. The image creation control means 105 inputs the image creation program 701 from the external memory medium 107 to the main body 100, and creates an image data on the basis of operation signals inputted from the tablet 101 and the switch 102 in accordance with the image creation program 701.

The memory control means 104 not only stores the created image data into an internal memory section 106 as an image data 601, but stores the attribute information of the image creation program used for creation of this image data into the internal memory section 106 as an attribute information 602. Furthermore, the created image data is converted into a visual signal by a graphics conversion means 109 and, in turn, displayed on a monitor 108.

A data transfer means 110 controls transmission of image data and attribute information between the external memory medium 107 and the internal memory section 106. An input means 113 inputs an attribute information 704 of individual image data 703 stored in the external memory medium 107.

A judging means 111 makes a judgment as to whether or not a currently running image creation program fed from the image creation control means 105 has the same attribute information as the attribute information 602 of the image data 601 stored in the internal memory section 106. When their attribute information disagree with each other, a signal representative of disagreement is supplied to a prohibiting means 112. In response to this disagreement signal, the prohibiting means 112 prohibits the transmission of the image data from the internal memory section 106 to the external memory medium 107.

Furthermore, the judging means 111 makes a judgment as to whether or not the currently running image creation program fed from the image creation control means 105 has the same attribute information as the attribute information 704 of the image data 703 stored in the external memory medium 107 and inputted through the input means 113. When their attribute information disagree with each other, the disagreement signal is supplied to the prohibiting means 112. In response to this disagreement signal, the prohibiting means 112 prohibits the transmission of the image data from the external memory medium 107 to the internal memory section 106.

With above arrangement, the data transmission between the external memory medium 107 and the internal memory section 106 is prohibited when the image data 601 stored in the internal memory section 106 has an attribute information different from that of the currently running image creation program. In other words, it is impossible to reserve the created image data into the external memory medium 107.

On the contrary, when the image data 601 stored in the internal memory section 106 has the same attribute information as that of the currently running image creation program, this image data 601 is stored together with its attribute information 602 into the external memory medium 107.

Furthermore, when the image data 703 stored in the external memory medium 107 has an attribute information different from that of the currently running image creation program, the image data 703 cannot be transferred to the internal memory section 106.

3. THIRD EMBODIMENT

Figure 17:
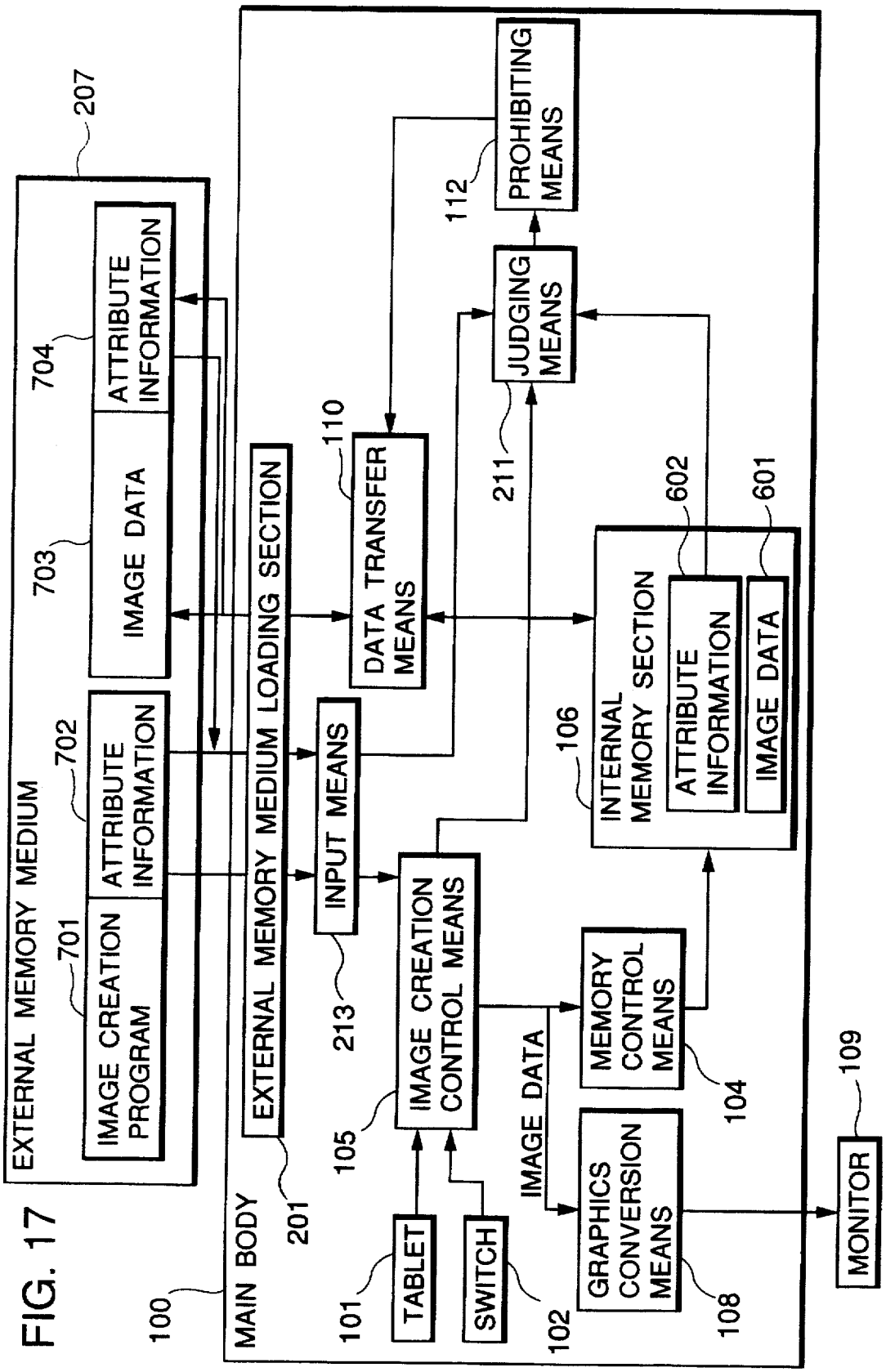
FIG. 17 is a block diagram showing still another embodiment of the image creating apparatus in accordance with the present invention.

Next, a third embodiment of the image creating apparatus in accordance with the present invention will be explained with reference to FIG. 17. In this embodiment, the same reference numerals as the previous embodiment have been applied to like parts.

An external memory medium 207 stores the image creation program 701 and its attribute information 702, as well as the image data 703 and its attribute information 704. An external memory medium loading section 201, provided at an appropriate portion on the surface of the main body 100, serves as a means for installing the external memory medium 207 into the main body 100. An input means 213 inputs the image creation program 701 and the attribute information 702, 704 from the external memory medium 207.

The judging means 211 makes a judgment as to whether or not a currently running image creation program fed from the image creation control means 105 has the same attribute information as the attribute information 602 of the image data 601 stored in the internal memory section 106. When their attribute information disagree with each other, the disagreement signal is supplied to the prohibiting means 112. In response to this disagreement signal, the prohibiting means 112 prohibits the transmission of the image data from the internal memory section 106 to the external memory medium 207.

Furthermore, the judging means 211 makes a judgment as to whether or not the currently running image creation program fed from the image creation control means 105 has the same attribute information as the attribute information 704 of the image data 703 stored in the external memory medium 207 and inputted through the input means 213. When their attribute information disagree with each other, the disagreement signal is supplied to the prohibiting means 112. In response to this disagreement signal, the prohibiting means 112 prohibits the transmission of the image data from the external memory medium 207 to the internal memory section 106.

With the above arrangement, the data transmission between the external memory medium 207 and the internal memory section 106 is prohibited when the image data 601 stored in the internal memory section 106 has an attribute information different from that of the currently running image creation program. In other words, it is impossible to reserve the created image data into the external memory medium 207.

On the contrary, when the image data 601 stored in the internal memory section 106 has the same attribute information as that of the currently running image creation program, this image data 601 is stored together with its attribute information 602 into the external memory medium 207.

Furthermore, when the image data 703 stored in the external memory medium 207 has an attribute information different from that of the currently running image creation program, the image data 703 cannot be transferred to the internal memory section 106.

4. FOURTH EMBODIMENT

Figure 18:
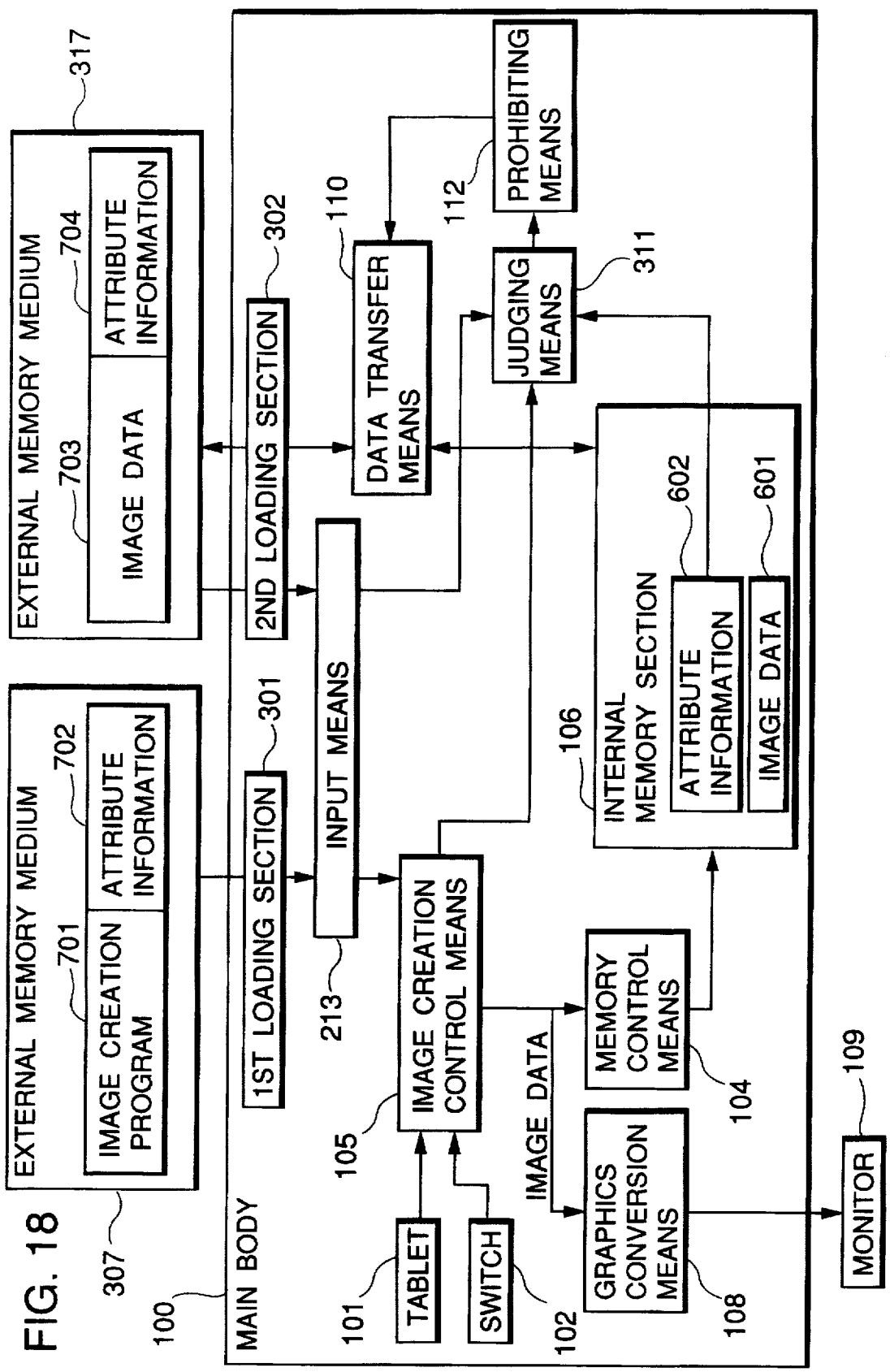
FIG. 18 is a block diagram showing yet another embodiment of the image creating apparatus in accordance with the present invention.

Next, a fourth embodiment of the image creating apparatus in accordance with the present invention will explained with reference to FIG. 18. In this embodiment, the same reference numerals as the previous embodiment have been applied to like parts.

An external program memory medium 307 stores the image creation program 701 and its attribute information 702. An external data memory medium 317 stores the image data 703 and its attribute information 704. A first loading section 301, provided at an appropriate portion on the surface of the main body 100, serves as a means for installing the external program memory medium 307 into the main body 100. A second loading section 302, provided at an appropriate portion on the surface of the main body 100, serves as a means for installing the external data memory medium 317 into the main body 100.

The input means 313 inputs the image creation program 701, the image data 703 and their attribute information 702, 704 from the external program memory medium 307 and the external data memory medium 317.

The judging means 311 makes a judgment as to whether or not a currently running image creation program fed from the image creation control means 105 has the same attribute information as the attribute information 602 of the image data 601 stored in the internal memory section 106. When their attribute information disagree with each other, the disagreement signal is supplied to the prohibiting means 112. In response to this disagreement signal, the prohibiting means 112 prohibits the transmission of the image data from the internal memory section 106 to the external memory medium 307.

Furthermore, the judging means 311 makes a judgment as to whether or not the currently running image creation program fed from the image creation control means 105 has the same attribute information as the attribute information 704 of the image data 703 stored in the external data memory medium 317 and inputted through the input means 313. When their attribute information disagree with each other, the disagreement signal is supplied to the prohibiting means 112. In response to this disagreement signal, the prohibiting means 112 prohibits the transmission of the image data from the external data memory medium 317 to the internal memory section 106.

With the above arrangement, the data transmission between the external data memory medium 317 and the internal memory section 106 is prohibited when the image data 601 stored in the internal memory sect ion 106 has an attribute information different from that of the currently running image creation program. In other words, it is impossible to reserve the created image data into the external memory medium 307.

On the contrary, when the image data 601 stored in the internal memory section 106 has the same attribute information as that of the currently running image creation program, this image data 601 is stored together with its attribute information 602 into the external data memory medium 317.

Furthermore, when the image data 703 stored in the external data memory medium 317 has an attribute information different from that of the currently running image creation program, the image data 703 cannot be transferred to the internal memory section 106.

By the way, the external data memory medium 317 would be able to store a plurality of image data 703 created by the different image creation programs. In such a case, if the image data 703 has an attribute information different from that of the currently running program, this image data 703 cannot be transferred from the external data memory medium 317 to the internal memory section 106. If the image data 703 has the same attribute information as that of the currently running program, this image data 703 can be transferred from the external data memory medium 317 to the internal memory section 106.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within metes and bounds of the claims, or equivalence of such metes and bounds are therefore intended to embraced by the claims.

What is claimed is:

1. An image creating device capable of being selectively loaded with one of a plurality of external program memory mediums, each storing a different image creation program, and one of a plurality of external image data memory mediums, each external image data memory medium being able to store a plurality of image data created in accordance with different image creation programs, the image creating device comprising:

an image data transfer device connected between an internal memory medium and the loaded external image data memory medium for transferring one of the plurality of said image data from said loaded external image data memory medium to an internal memory medium of the image creating device, the internal memory medium storing the transferred image data;

an image creation portion connected with said loaded external program memory medium and said internal memory medium, for reading the image creation program from said loaded external program memory medium and for reading the stored image data from the internal memory medium, and for changing the read image data to create a new image data in accordance with the loaded image creation program, on the basis of instructions from an operator;

an image data transfer controller connected with said loaded external image data memory medium and said image creation portion, for determining whether said one of the plurality of image data stored in said loaded external image data memory medium has been created in accordance with an image creation program which is the same as the loaded image creation program when transferring said one of the plurality of said image data from said loaded external image data memory medium to the internal memory medium, and for prohibiting the transfer of said one of the plurality of said image data from said loaded external image data memory medium to the internal memory medium if the said one of said plurality of said image data has not been created in accordance with an image creation program which is the same as the loaded image creation program;

each image creation program having attribute information indicative of an identification of the image creation program and each image data having attribute information indicative of the image creation program which the image data has been created in accordance with, and the image data transfer controller includes:

a judging portion connected with said image creation portion and said loaded external image data memory medium, and operable to determine, based on the attribute information of the loaded image creation program and said one of the plurality of image data stored in the loaded external image data memory medium whether the one of the plurality of image data stored in the loaded external image data memory medium has been created in accordance with an image creation program which is the same as the loaded image creation program.

2. An image creating device as defined in claim 1, wherein the image data transfer controller further includes a prohibiting portion connected with said judging portion and said image data transfer device, and responsive to the judging portion to prohibit the transfer of the one of said plurality of image data stored in the loaded external image data memory medium if the one of said plurality of image data stored in the loaded external image data memory medium has not been created in accordance with an image creation program which is the same as the loaded image creation program.

3. An image creating device capable of being selectively loaded with one of a plurality of external program memory mediums, each storing a different image creation program, and one of a plurality of external image data memory mediums, each external image data memory medium being able to store a plurality of image data created in accordance with different image creation programs, the image creating device comprising:

an image data transfer device connected between an internal memory medium and the loaded external image data memory medium for transferring one of the plurality of said image data from said loaded external image data memory medium to an internal memory medium of the image creating device, the internal memory medium storing the transferred image data;

an image creation portion connected with said loaded external program memory medium and said internal memory medium, for reading the image creation program from said loaded external program memory medium and for reading the stored image data from the internal memory medium, and for changing the read image data to create a new image data in accordance with the loaded image creation program, on the basis of instructions from an operator;

an image data transfer controller connected with said loaded external image data memory medium and said image creation portion, for determining whether said one of the plurality of image data stored in said loaded external image data memory medium has been created in accordance with an image creation program which is the same as the loaded image creation program when transferring said one of the plurality of said image data from said loaded external image data memory medium to the internal memory medium, and for prohibiting the transfer of said one of the plurality of said image data from said loaded external image data memory medium to the internal memory medium if the said one of the said plurality of said image data has not been created in accordance with an image creation program which is the same as the loaded image creation program;

the internal memory medium being further operable to store a plurality of image data having been created in accordance with an image creation program different from the loaded image creation program;

the image data transfer device being further operable to transfer one of the plurality of image data from the internal memory medium to a loaded external image data memory medium; and the image data transfer controller being further operable to determine whether the one of the plurality of image data from the internal memory medium has been created in accordance with an image creation program which is the same as the loaded image creation program, and prohibit the transfer of the one of the plurality of image data from the internal memory medium if the one of the plurality of image data stored in the internal memory medium has not been created in accordance with an image creation program which is the same as the loaded image creation program.

4. An image creating device capable of being selectively loaded with one of a plurality of external program memory mediums, each storing a different image creation program, and one of a plurality of external image data memory mediums, each external image data memory medium being able to store a plurality of image data created in accordance with different image creation programs, the image creating device comprising:

an image data transfer device connected between an internal memory medium and the loaded external image data memory medium for transferring one of the plurality of said image data from said loaded external image data memory medium to an internal memory medium of the image creating device, the internal memory medium storing the transferred image data;

an image creation portion connected with said loaded external program memory medium and said internal memory medium, for reading the image creation program from said loaded external program memory medium and for reading the stored image data from the internal memory medium, and for changing the read image data to create a new image data in accordance with the loaded image creation program, on the basis of instructions from an operator;

an image data transfer controller connected with said loaded external image data memory medium and said image creation portion, for determining whether said one of the plurality of image data stored in said loaded external image data memory medium has been created in accordance with an image creation program which is the same as the loaded image creation program when transferring said one of the plurality of said image data from said loaded external image data memory medium to the internal memory medium, and for prohibiting the transfer of said one of the plurality of said image data from said loaded external image data memory medium to the internal memory medium if the said one of the said plurality of said image data has not been created in accordance with an image creation program which is the same as the loaded image creation program;

one external program memory medium and one external image data memory medium being integrated into a single external medium;

the new image data being stored in the internal memory medium, and the image data transfer device being further operable to transfer the new image data from the internal memory medium to the image data memory medium of the single external medium;

the image data transfer controller being further operable to determine whether a loaded external memory medium has the same image creation program as the loaded image creation program with which the new image data has been created;

each image creation program having attribute information indicative of an identification of the image creation program and each image data has attribute information indicative of the image creation program which the image data has been created in accordance with, and the image data transfer controller includes:

a judging portion connected with said image creation portion and said loaded external memory medium, and operable to determine, based on the attribute information of the image creation program of the loaded external memory medium and the image creation portion whether the image creation program of the loaded external memory medium is the same as that of the image creation portion.

5. An image creating device as defined in claim 4, wherein the image data transfer controller further includes a prohibiting portion connected with said judging portion and said image data transfer device, and responsive to the judging portion to prohibit the transfer of the image data if the image creation program of the loaded external memory medium is not the same as that of the image creation portion.

* * * * *